Patented Aug. 7, 1951

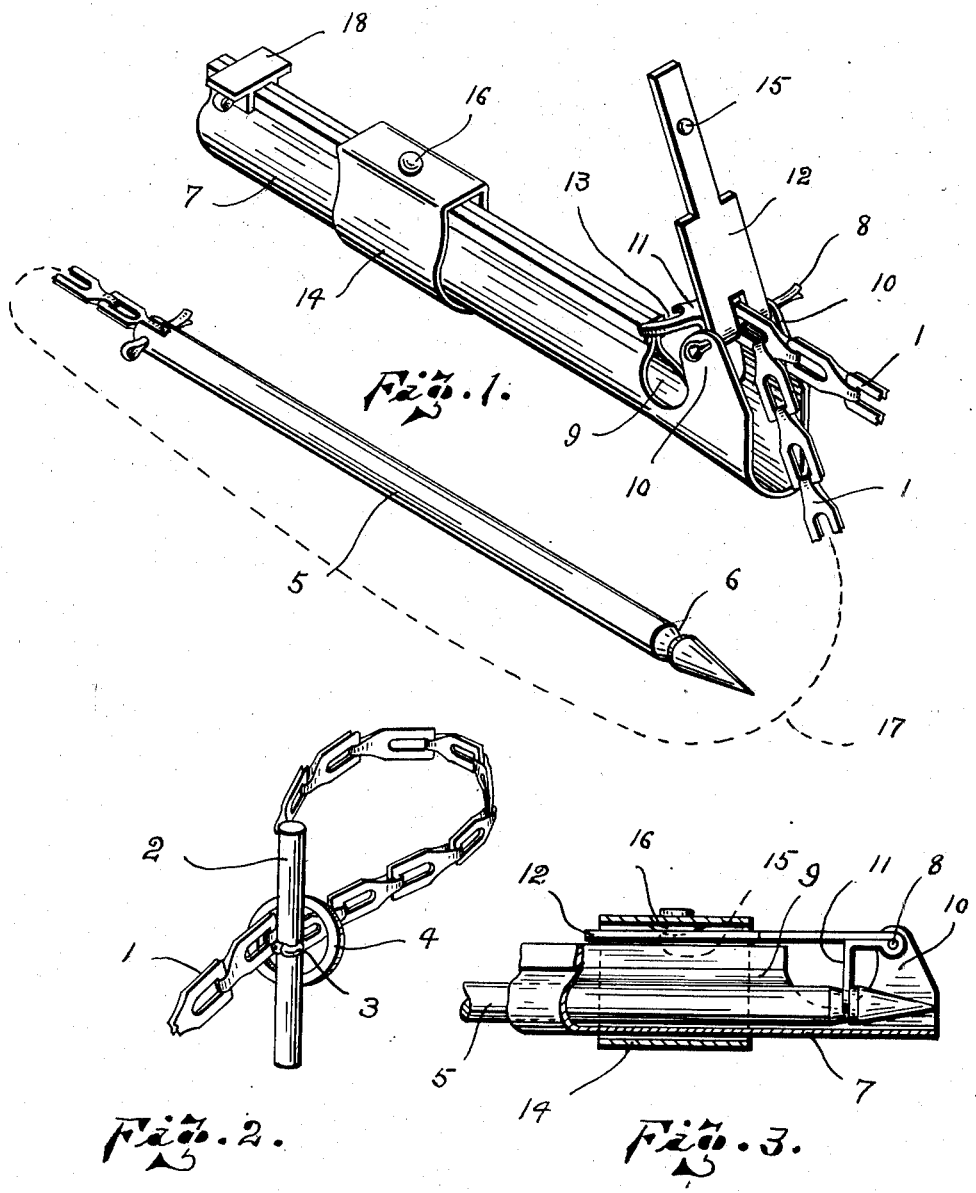

2,563,480

UNITED STATES PATENT OFFICE 2,563,480

FISH STRINGER

James Wade Montgomery, Sr., Duluth, Minn.

Application April 23, 1949, Serial No. 89,219

3 Claims. (Cl. 224—7)

This invention relates to the art of fishing and has special reference to a device on which fish may be strung after they are caught.

It is well known among fishermen that fish stringers which are at present available are not too satisfactory. Some are made of rope which rots unless dried carefully after each use, and the ropes are often broken by larger fish, just the ones that are best to bring home. Most stringers must be tied to something, such as a boat, and when a fish is caught and must be put on the stringer, the latter must be untied from the boat in order to get the fish on the stringer, thus affording an opportunity to lose either the fish just caught or the stringer during the procedure.

It is one of my principal objects to provide a fish stringer which will overcome as many of the disadvantages of presently used stringers as possible.

Another object is to provide a loop or bight in a stringer on which fish are carried, and novel means for permitting access to the bight for putting fish on the stringer.

Another object is to provide means to place fish on a stringer without untying the latter from the support to which it is attached.

Another object is to provide a positive means to securely lock the fish holding loop in closed position yet permitting it to be unlocked readily when it is desired to string fish thereon.

A further object is to provide means to adjust the size of the fish holding loop.

A still further object is to provide means to secure the stringer to a support, such as a boat or the like, in a simple yet secure manner.

These and other objects and advantages will become more apparent as the description of my invention proceeds.

In the accompanying drawing forming a part of this application:

Fig. 1 is a perspective view of the needle and needle receiver of my stringer showing the fish carrying loop in dotted lines.

Figs. 2 is a perspective view of the end of my stringer which is normally secured to a support.

Fig. 3 is a broken side elevational view, partly in section, of the needle and its receiver in assembled relation.

In the drawing, the reference numeral 1 indicates a length of preferably galvanized or brass chain which forms the stringing line of my device.

As means to attach the stringer to a support, I prefer a rigid bar 2 of about two inches in length which is secured to the end link of the chain by means of a cotter key 3 or the like. A washer or ring 4 is slidably installed on the chain, and this arrangement permits ready attaching of the end of the stringer to a support of any reasonable size by merely wrapping the chain around the support, threading the bar 2 longitudinally through the ring 4, and turning the bar transversely of the ring as the chain is pulled tight. Such a fastening will not come loose accidentally.

To string fish on my device, I install a long, slender needle 5 on the opposite end of the chain to the bar 2, preferably by means of a cotter key as shown, and the end of the needle is provided with an annular notch 6 adjacent the pointed end thereof. The pointed needle permits ready impaling of fish on the stringing line in any desired manner.

I install the needle receiver 7 intermediate the ends of my stringer line 1 as by a cotter key 8 or the like which extends through one end of the receiver and through one link of the chain 1, preferably as shown.

The receiver comprises a main body portion having a substantially circular opening or socket 9 longitudinally therethrough to receive the needle 5, and adjacent one end of the body portion, a pair of lugs 10 are provided in spaced relation to each other, and through which the cotter key or pin 8 extends to hold the chain 1. Also mounted on the pin 8 intermediate the lugs 10 is an angular locking lever 11—12 which is pivotal at the apex of its angle, and the legs of the lever being disposed preferably at right angles to each other. The lever is preferably bifurcated at its apex to receive the link of the chain through which the pin 8 extends.

The short leg 11 of the lever is notched at its outer end as at 13 so that when the lever is swung inwardly to its limit, the notched portion 13 of the lever engages itself in the notch 6 of the needle, and locks the needle within the body portion by preventing its being pulled outwardly.

The longer leg 12 of the lever, preferably has its outer end reduced as shown, and the body portion of the receiver has a ridge on one side thereof against which the leg 12 abuts when in innermost position. A sleeve 14 is slidably mounted on the body portion of the receiver so as to overlap the leg 12 and hold the lever in innermost position and prevent accidental removal of the needle from the receiver. A depression 15 is formed in the surface of the leg 12, and a corresponding inward bulge 16, such as the head of a rivet, is provided on the sleeve 14 to secure the sleeve and lever in assembled relation.

It is to be noted that by having the needle receiver installed intermediate of the ends of the chain, and by locking the needle therein, a loop or bight is formed, as suggested in dotted lines at 17, and the fish are carried in this loop or bight, and do not contact the receiver or the pin or needle when they are in place on the loop, as, obviously, they will be carried at the bottom of the loop, or substantially centrally between the needle and receiver. This feature permits the stringing of fish on the loop of the chain without having to interfere in any way with the fastening of the stringer to the boat or support, and also without interfering with the fish already on the stringer. To string fish on the loop, all that is necessary is to pull the chain out of the water until the receiver can be grasped, then unlock the lever 11—12 by slipping the sleeve 14 therefrom to release the needle 5 which is used to thread fish on to the chain. When the fish are on the chain or stringing line, the needle is put back in the receiver and locked in place by the lever and sleeve.

At the free end of the receiver I have provided a stop 18 to prevent the removal of the sleeve 14 from the receiver and the stop also acts as a convenient thumb rest for manipulating the receiver when inserting and removing the needle.

It is deemed apparent that the size of the fish holding loop or bight may readily be changed as desired by attaching the needle receiver to the chain in any desired or suitable position.

Having thus described my invention, what I claim is:

1. As a new article of manufacture, a fish stringer comprising a length of chain, means at one end of said chain to secure same to a support, a needle at the opposite end of said chain, said needle having an annular notch adjacent one end thereof, a receiver secured intermediate the ends of said chain and having a socket to receive said needle whereby a fish holding loop is formed, and means to secure said needle within said receiver comprising a sleeve slidably carried on said receiver, an angular lever pivotally mounted on said receiver and having one leg adapted to engage said notch in said needle and the other leg adapted to be carried against said receiver and held by said sleeve, and means on said lever and sleeve to lock said needle within said receiver.

2. As a new article of manufacture, a fish stringer comprising a length of chain, means at one end of said chain to secure same to a support, a needle at the opposite end of said chain, said needle having a notched end, a receiver secured intermediate the ends of said chain and having a socket to receive said needle and form a fish holding loop in said chain, and means to lock said needle within said receiver comprising a sleeve on said receiver, an angular lever pivotally mounted on said receiver and having one leg adapted to engage in said notched end and the other leg adapted to overlap a portion of said receiver and be engaged by said sleeve to lock said needle in said receiver.

3. As a new article of manufacture, a fish stringer comprising a stringing line, means at one end of said line to connect same to a support, a needle at the opposite end of said line, said needle having a notch therein, a receiver secured intermediate the ends of said line and having a socket to receive said needle and form a fish holding loop with a portion of said line, and means to secure said needle within said receiver comprising a sleeve on said receiver, an angular lever pivotally mounted on said receiver and having one leg adapted to enter said socket and engage said notch and the other leg adapted to overlap a portion of said receiver and be engaged by said sleeve to secure said needle in said receiver.

JAMES WADE MONTGOMERY, Sr.

REFERENCES CITED

The following references are of record in the file of this patent:

UNITED STATES PATENTS

| Number | Name | Date |
| --- | --- | --- |
| 521,063 | Wettstein | June 5, 1894 |
| 675,118 | Sweet | May 28, 1901 |
| 2,441,450 | Smigleski | May 11, 1948 |
| 2,453,381 | Orton | Nov. 9, 1948 |
| 2,455,766 | Harvey | Dec. 7, 1748 |